(12) United States Patent
Kanegae et al.

(10) Patent No.: US 11,603,014 B2
(45) Date of Patent: Mar. 14, 2023

(54) OCCUPANT PROTECTION DEVICE

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 252 days.

(21) Appl. No.: 16/899,687

(22) Filed: Jun. 12, 2020

(65) Prior Publication Data

US 2021/0023966 A1 Jan. 28, 2021

(30) Foreign Application Priority Data

Jul. 22, 2019 (JP) .............................. JP2019-134727

(51) Int. Cl.
| | |
|---|---|
| *B60N 2/02* | (2006.01) |
| *B60R 21/0134* | (2006.01) |
| *B60R 21/16* | (2006.01) |
| *B60N 2/75* | (2018.01) |
| *B60R 21/015* | (2006.01) |

(52) U.S. Cl.
CPC .......... *B60N 2/0276* (2013.01); *B60N 2/753* (2018.02); *B60R 21/0134* (2013.01); *B60R 21/01516* (2014.10); *B60R 21/01538* (2014.10); *B60R 21/16* (2013.01); *B60N 2002/0268* (2013.01)

(58) Field of Classification Search
CPC .................. B60N 2/0276; B60N 2/753; B60N 2002/0268; B60R 21/0134; B60R 21/01516; B60R 21/01538; B60R 21/16
See application file for complete search history.

(56) References Cited

U.S. PATENT DOCUMENTS

| | | | |
|---|---|---|---|
| 5,076,645 A | 12/1991 | Yokota | |
| 6,250,671 B1 * | 6/2001 | Osmer | B60R 21/0152 180/271 |

(Continued)

FOREIGN PATENT DOCUMENTS

| | | |
|---|---|---|
| DE | 103 55 882 A1 | 7/2004 |
| FR | 2 789 142 A1 | 8/2000 |

(Continued)

*Primary Examiner* — Aniss Chad
*Assistant Examiner* — Christine Nguyen Huynh
(74) *Attorney, Agent, or Firm* — Smith, Gambrell & Russell, LLP

(57) ABSTRACT

An occupant protection device for a vehicle includes: a collision predictor configured to predict a collision of the vehicle; a main airbag configured to deploy toward an occupant from a front of the vehicle when the collision predictor predicts a collision of the vehicle; an occupant center-of-gravity detecting device configured to detect a position of a center of gravity of the occupant; an armrest moving device configured to move an armrest; and a deployment controller configured to cause, when the collision predictor predicts a collision of the vehicle, the armrest moving device to move the armrest upward to guide the center of gravity of the occupant into a proper range on the basis of the position of the center of gravity of the occupant detected by the occupant center-of-gravity detecting device, subsequently cause the armrest moving device to remove the armrest, and thereafter, cause the main airbag to deploy.

12 Claims, 5 Drawing Sheets

(56) References Cited

U.S. PATENT DOCUMENTS

| | | |
|---|---|---|
| 9,573,497 B2 * | 2/2017 | Jaradi ................ B60N 2/4207 |
| 10,272,865 B2 | 12/2019 | Nagasawa |
| 2004/0090104 A1 | 5/2004 | Seibold |
| 2007/0193811 A1 * | 8/2007 | Breed ............... B60R 21/01552 |
| | | 180/271 |
| 2008/0303335 A1 | 12/2008 | Van de Ven et al. |
| 2013/0076096 A1 | 3/2013 | Pacolt |
| 2014/0175850 A1 | 6/2014 | Roeglin et al. |
| 2015/0175039 A1 | 6/2015 | Jarardi et al. |
| 2015/0191111 A1 | 7/2015 | Marini et al. |
| 2017/0217342 A1 | 8/2017 | Grüdl et al. |

FOREIGN PATENT DOCUMENTS

| | | |
|---|---|---|
| FR | 2 982 210 A1 | 5/2013 |
| JP | 2016-185268 A | 10/2016 |
| JP | 2017-132384 A | 8/2017 |
| JP | 2018-052441 A | 4/2018 |
| JP | 2018-171990 A | 11/2018 |
| JP | 2018172002 A * | 11/2018 |

* cited by examiner

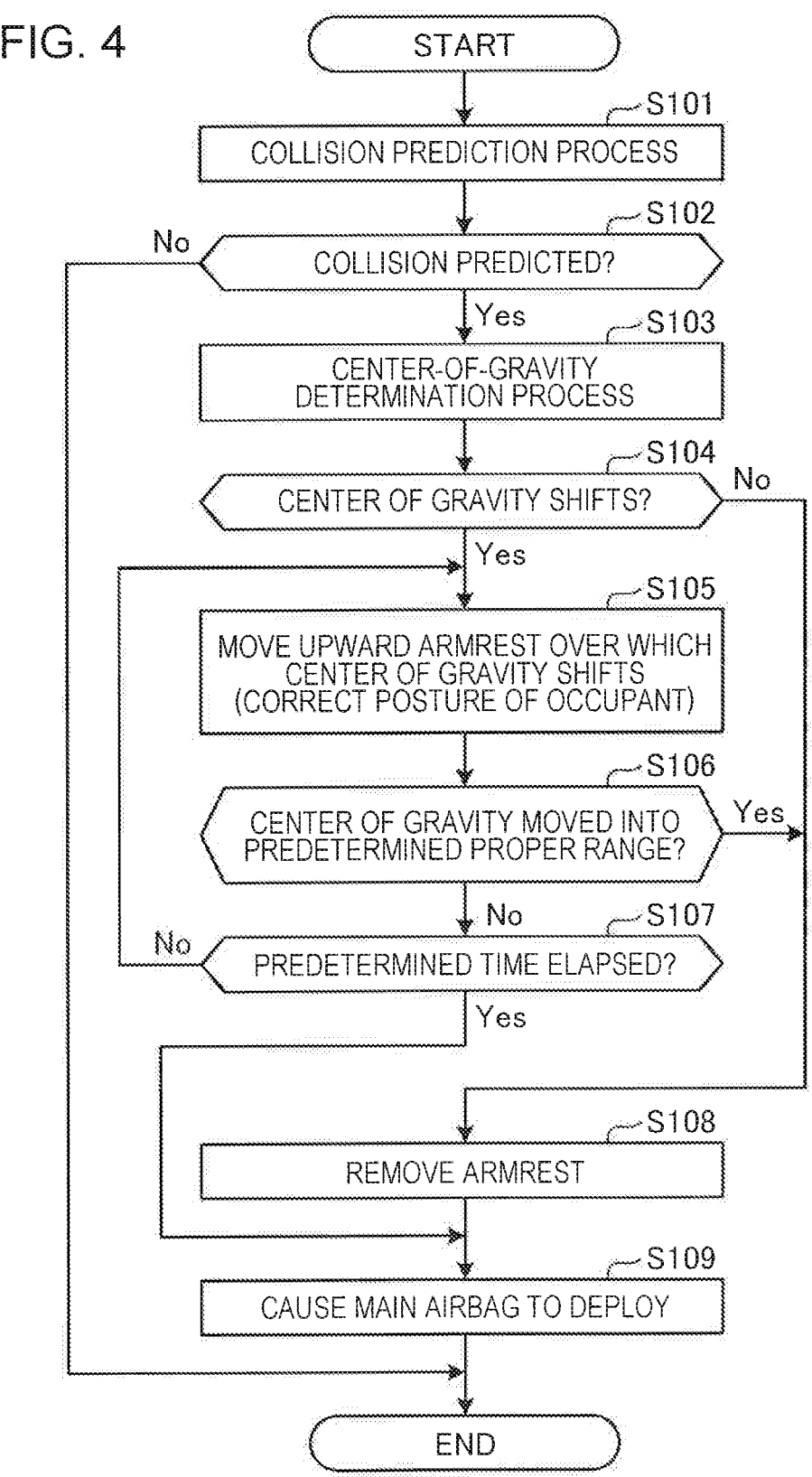

OCCUPANT PROTECTION DEVICE

CROSS-REFERENCE TO RELATED APPLICATIONS

The present application claims priority from Japanese Patent Application No. 2019-134727 filed on Jul. 22, 2019, the entire contents of which are hereby incorporated by reference.

BACKGROUND

The disclosure relates to an occupant protection device.

To protect an occupant from a collision and so on, a vehicle, such as an automobile, is provided with an airbag device as an occupant protection device.

The airbag device is typically constituted by an impact sensor, an inflator, an airbag, a control device, and so on. In the airbag device, when the impact sensor detects the impact of, for example, a front collision, the impact sensor outputs a detection signal to the control device, the control device sends an activation signal to the inflator, and the inflator generates gas and sends the gas to the airbag. The airbag is instantaneously inflated with the gas sent from the inflator and deploys in front of the occupant. Accordingly, the airbag holds, with the gas pressure inside thereof, the body of the occupant moving forward due to the impact and deflates while absorbing the kinetic energy. Consequently, abrupt forward movement of the occupant caused by the impact exerted by, for example, the front collision of the automobile is slowed by the airbag, and the safety of the occupant is ensured.

Currently, autonomous driving technology is being studied. In a vehicle employing such autonomous driving, the travel state of the vehicle is controlled regardless of the intention of an occupant, such as the driver. Accordingly, an occupant protection device for such an autonomous driving vehicle is being proposed. This vehicle occupant protection device includes a front airbag that deploys in front of the upper body of the occupant. The front airbag has a shoulder-rest recess in a part with which the shoulder in the upper body of the occupant moving forward from the seating position comes into contact so that the shoulder fits in the shoulder-rest recess. Accordingly, even if the upper body of the occupant sitting in the seat moves forward from the seating position before a collision during autonomous driving of the vehicle, the shoulder in the upper body is supported by the shoulder-rest recess so as to protect the occupant. In the vehicle occupant protection device, the front airbag has an inclined surface that extends from the shoulder-rest recess toward one side in the vehicle width direction such that the inclined surface on the one side is located backward relative to the inclined surface on the other side. Accordingly, the entire upper body that moves forward in a diagonal posture in which the shoulder on the other side is located forward relative to the shoulder on the one side can be held and supported by the inclined surface of the front airbag, the entire upper body can be supported in a stable state, and the impact can be absorbed in the stable state (see Japanese Unexamined Patent Application Publication No. 2018-052441).

SUMMARY

An aspect of the disclosure provides an occupant protection device for a vehicle. The occupant protection device includes a collision predictor, a main airbag, an occupant center-of-gravity detecting device, an armrest moving device, and a deployment controller. The collision predictor is configured to predict a collision of the vehicle. The main airbag is configured to deploy toward an occupant from a front of the vehicle when the collision predictor predicts a collision of the vehicle. The occupant center-of-gravity detecting device is configured to detect a position of a center of gravity of the occupant. The armrest moving device is configured to move an armrest. The deployment controller is configured to cause, when the collision predictor predicts a collision of the vehicle, the armrest moving device to move the armrest upward to guide the center of gravity of the occupant into a proper range on the basis of the position of the center of gravity of the occupant detected by the occupant center-of-gravity detecting device, subsequently cause the armrest moving device to remove the armrest, and thereafter, cause the main airbag to deploy.

An aspect of the disclosure provides an occupant protection device for a vehicle. The occupant protection device includes a main airbag, an occupant center-of-gravity detecting device, an armrest moving device, and circuitry. The main airbag is configured to deploy toward an occupant from a front of the vehicle when a collision of the vehicle is predicted. The occupant center-of-gravity detecting device is configured to detect a position of a center of gravity of the occupant. The armrest moving device is configured to move an armrest. The circuitry is configured to predict a collision of the vehicle. The circuitry is configured to cause, when a collision of the vehicle is predicted, the armrest moving device to move the armrest upward to guide the center of gravity of the occupant into a proper range on the basis of the position of the center of gravity of the occupant detected by the occupant center-of-gravity detecting device, subsequently cause the armrest moving device to remove the armrest, and thereafter, cause the main airbag to deploy.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 3A-1 to FIG. 3C-2 illustrate movement of an armrest and deployment of an airbag body, where FIG. 3A-1 to FIG. 3C-1 are side views and FIG. 3A-2 to FIG. 3C-2 are front views;

FIG. 4 is a flowchart illustrating overall operations of the occupant protection device; and FIG. 5A-1 to FIG. 5C-2 illustrate movement of the armrest and deployment of the airbag body in a case where the posture of the occupant is not corrected, where FIG. 5A-1 to FIG. 5C-1 are side views and FIG. 5A-2 to FIG. 5C-2 are front views.

DETAILED DESCRIPTION

With the widespread and full-scale use of autonomous driving, the riding state of an occupant becomes more flexible. Accordingly, for example, even when the occupant is sitting in the driver's seat, the occupant may be holding a portable terminal or the like in their hand during traveling of the vehicle. Currently, an occupant sitting in a seat other than the driver's seat may be holding a portable terminal or the like in their hand during traveling of the vehicle. Further, an occupant may be resting their arm on an armrest.

In a case where an occupant is holding a portable terminal or the like or resting their arm on an armrest when the front airbag deploys toward the occupant, for example, the arm of the occupant is sandwiched between the front airbag and the upper body of the occupant, and it is difficult to provide optimum occupant protection.

When the armrest is carelessly pulled down in a case where the occupant's weight is put on the armrest, the posture of the occupant may become off balance, and an unexpected situation where the occupant falls off the seat may occur.

Accordingly, it is desirable to provide an occupant protection device that can provide optimum occupant protection even in a case where an occupant is resting their arm on an armrest.

Figure 1A:
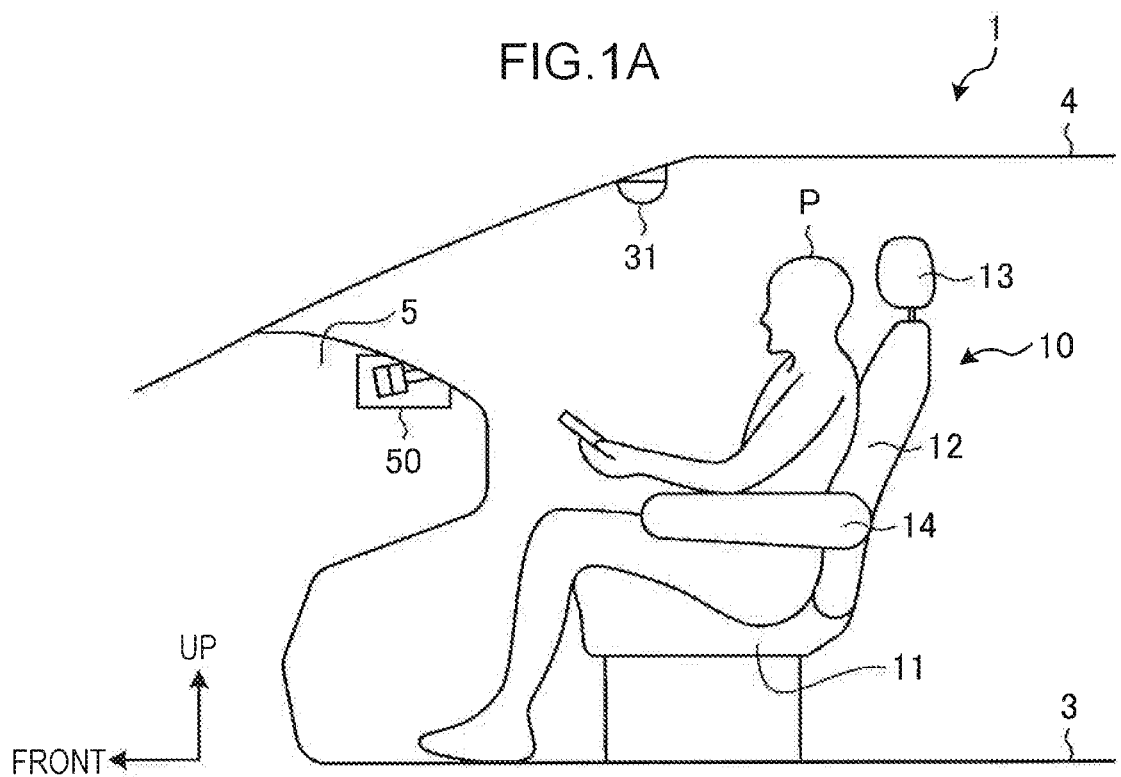
FIG. 1A and FIG. 1B are cross-sectional views and illustrate part of a vehicle provided with an occupant protection device according to an embodiment of the disclosure.
Figure 1B:
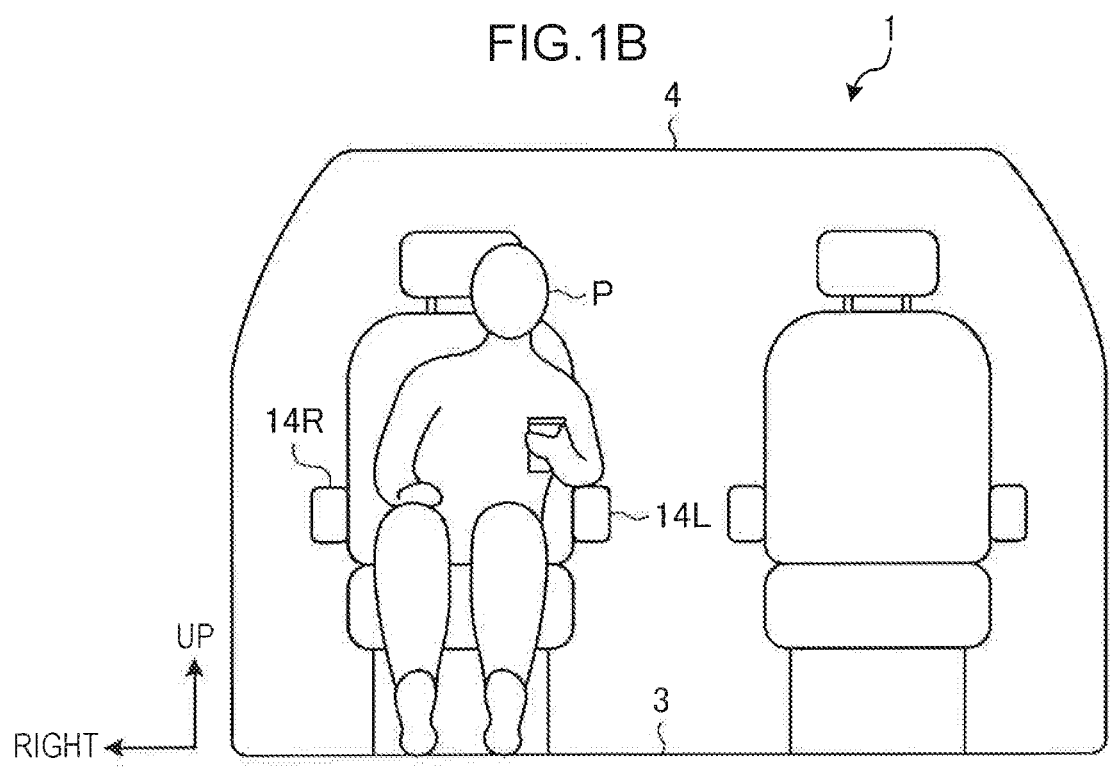
Figure 2:
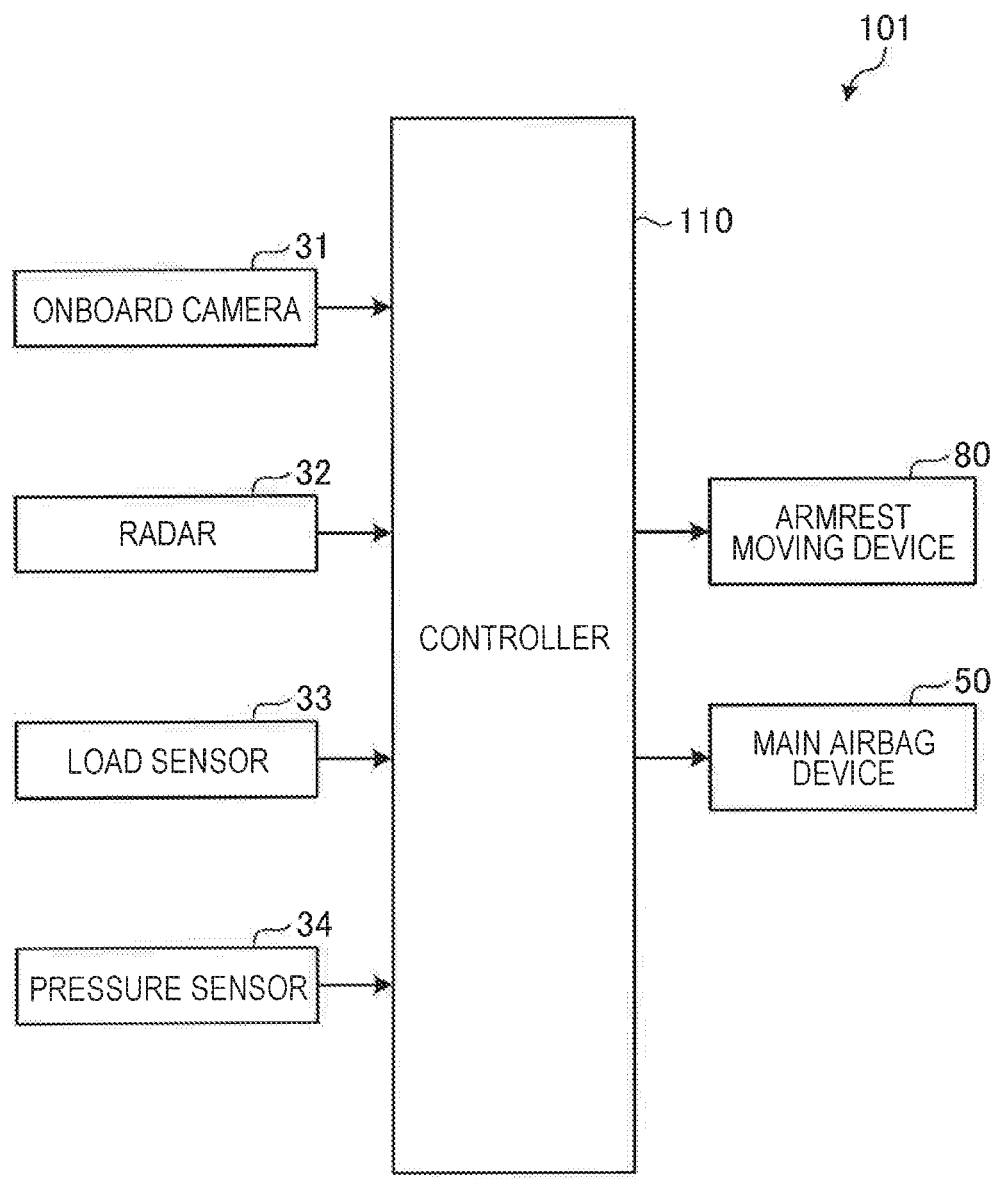
FIG. 2 is a schematic block diagram of the occupant protection device according to the embodiment of the disclosure.
Figures 1, 3A:
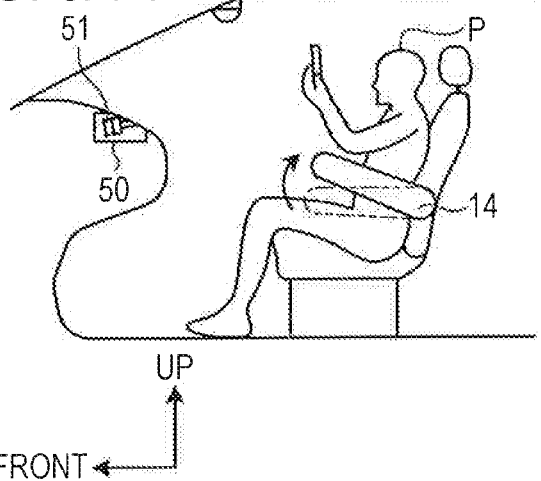
Figures 2, 3A:
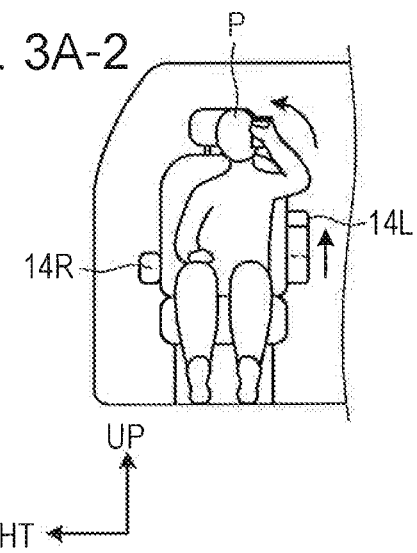
Figures 1, 3B:
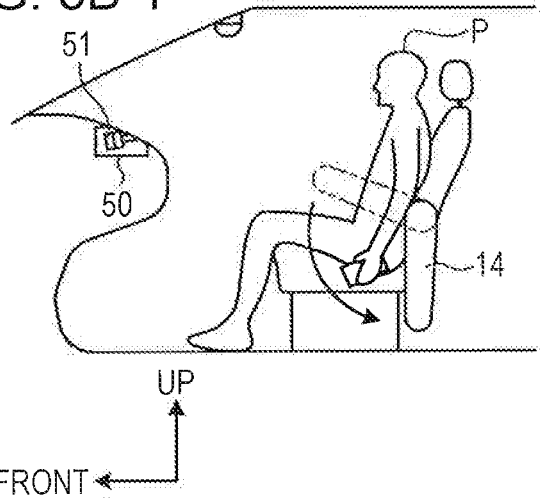
Figures 2, 3B:
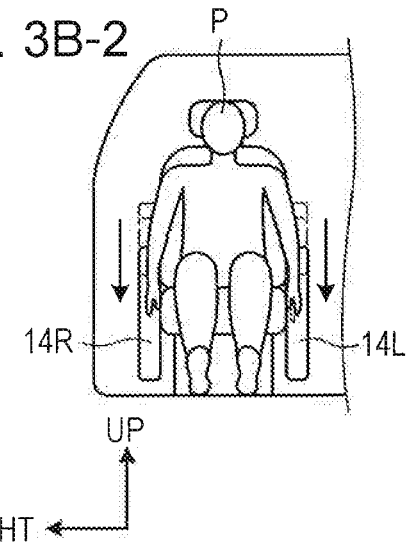
Figures 1, 3C:
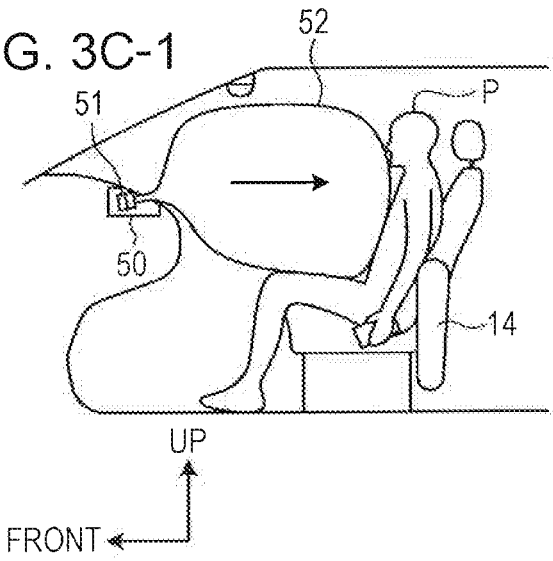
Figures 2, 3C:
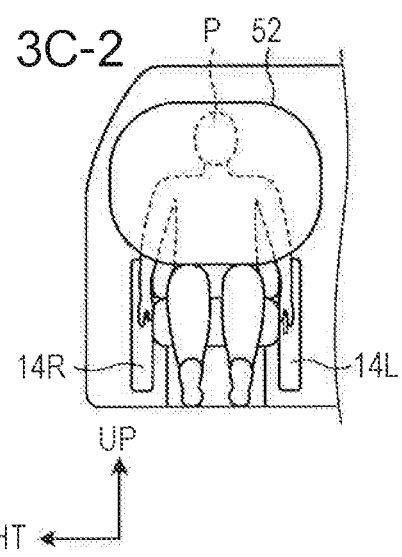
Figures 1, 5A:
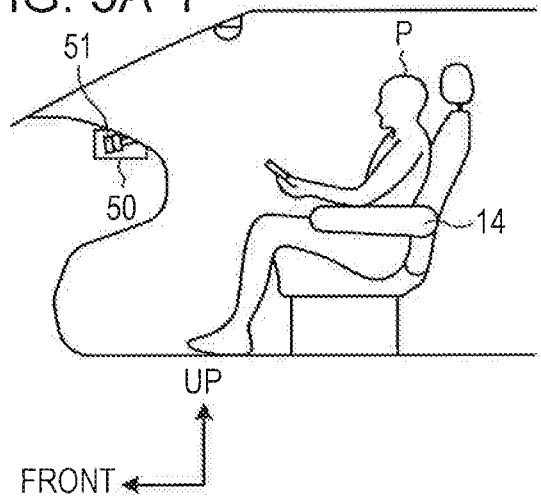
Figures 2, 5A:
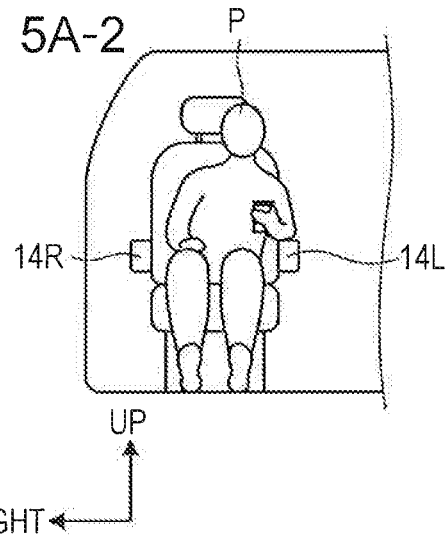
Figures 1, 5B:
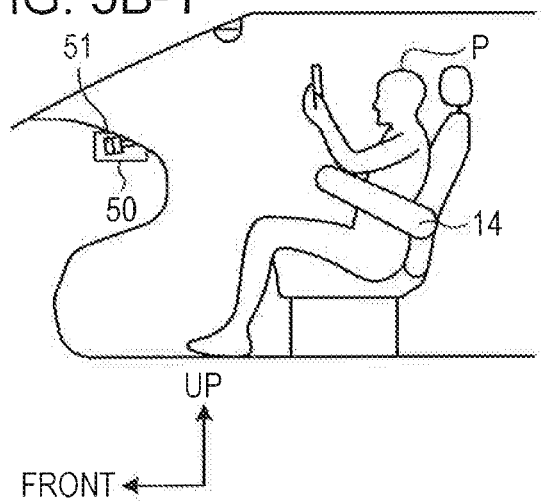
Figures 2, 5B:
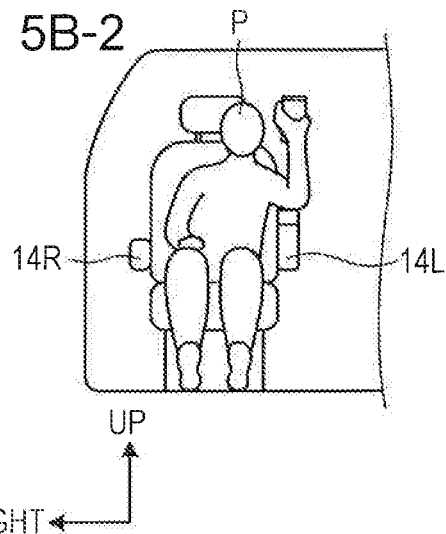
Figures 1, 5C:
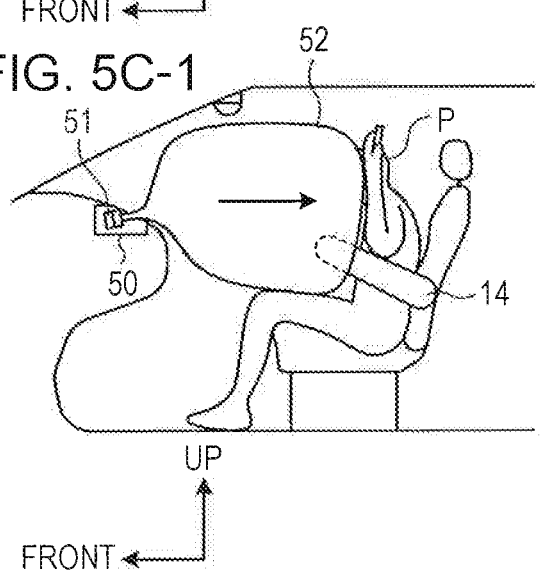
Figures 2, 5C:
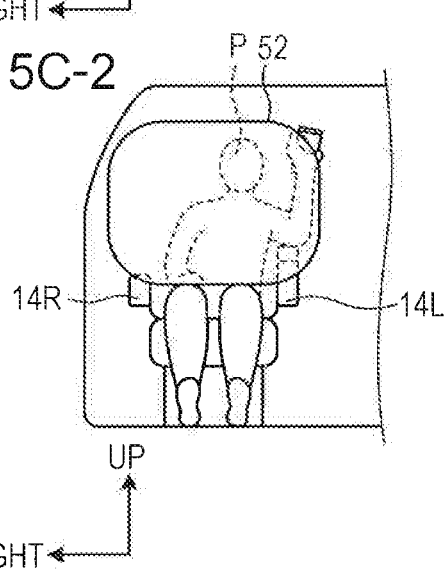

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1A and FIG. 1B are cross-sectional views and illustrate part of a vehicle provided with an occupant protection device according to an embodiment of the disclosure. FIG. 2 is a schematic block diagram of the occupant protection device according to the embodiment of the disclosure. FIG. 3A-1 to FIG. 3C-2 illustrate movement of an armrest and deployment of an airbag body in a case where the occupant protection device according to this embodiment is activated, where FIG. 3A-1 to FIG. 3C-1 are side views and FIG. 3A-2 to FIG. 3C-2 are front views. FIG. 4 is a flowchart illustrating overall operations of the occupant protection device. FIG. 5A-1 to FIG. 5C-2 illustrate movement of the armrest and deployment of the airbag body in a case where the posture of the occupant is not corrected even though the armrest is moved, where FIG. 5A-1 to FIG. 5C-1 are side views and FIG. 5A-2 to FIG. 5C-2 are front views.

Configuration of Vehicle 1

As illustrated in FIG. 1A and FIG. 1B, in the occupant compartment of a vehicle 1, a floor 3 is provided in the lower part and a roof 4 is provided in the upper part. On the floor 3, a seat 10 is disposed. The vehicle 1 is further provided with an occupant protection device 101 described below.

The seat 10 is a seat for an occupant P to be seated while the occupant P is riding in the vehicle 1. The seat 10 includes a seat cushion 11 (seat) that supports the buttocks to the femoral region of the occupant P, a seatback 12 (backrest) that is provided so as to be reclinable, a headrest 13 (head part) that supports the head of the occupant P, and an armrest 14 (armrest part) that supports the forearms and elbows of the occupant P. The armrest 14 includes a pair of right and left armrests, that is, a left armrest 14L disposed above and to the left of the seat cushion 11 and a right armrest 14R disposed above and to the right of the seat cushion 11.

The armrest 14 is disposed at a level substantially corresponding to the position of the elbow when the occupant P is sitting on the seat cushion 11, and extends toward the front of the vehicle 1 substantially horizontally from each outer side of the seatback 12. As described below, the armrest 14 can be rotated upward and downward about the fixing position at which the armrest 14 is fixed to the seatback 12.

Configuration of Occupant Protection Device 101

As illustrated in FIG. 2, the occupant protection device 101 includes an onboard camera 31, a radar 32, a load sensor 33, a pressure sensor 34, a main airbag device 50, an armrest moving device 80, and a controller 110. The main airbag device 50 is provided in a dashboard 5.

As described below, the controller 110 has functions of an airbag deployment control unit (also referred to as "airbag control unit (ACU)") that detects a collision and collision prediction of the vehicle 1 on the basis of information input from the onboard camera 31 and the radar 32 and controls deployment of an airbag body provided in the main airbag device 50. The controller 110 may be provided as part of a vehicle control device (hereinafter referred to as "electronic control unit (ECU)") that controls the vehicle 1 as a whole.

Onboard Camera 31

The onboard camera 31 is capable of capturing images of scenes outside and inside the vehicle 1. For example, the onboard camera 31 captures images of the environment around the vehicle 1, for example, scenes ahead of, behind, and on the sides of the vehicle 1. The onboard camera 31 captures an image of the inside of the vehicle so that the seating state of the occupant P sitting in the seat 10, for example, the position of the arm or hand of the occupant P, is known. Image information about the captured image is input to the controller 110, recorded to a random access memory (RAM) of the controller 110, and analyzed by the controller 110. Accordingly, the controller 110 can recognize the situation around the vehicle 1 (the situation outside the vehicle) in real time or in a follow-up manner. The controller 110 can recognize the situation inside the vehicle, for example, the state of the occupant P, in real time or in a follow-up manner. As the state of the occupant P, for example, the position of the arm or hand of the occupant P is assumed. The controller 110 can determine the position of the center of gravity of the occupant P on the basis of the obtained image information.

Radar 32

The radar 32 emits a radio wave to detect an object, such as an obstacle, and measure the distance to and the direction of the object. The radar 32 is installed on the front bumper and the rear bumper of the vehicle 1 so as to enable, for example, front monitoring, side monitoring, and rear monitoring for the vehicle 1. Monitoring information is input to the controller 110, recorded to the RAM of the controller 110, and analyzed by the controller 110.

Accordingly, the controller 110 can recognize the situation around the vehicle 1 in real time or in a follow-up manner.

In this embodiment, the onboard camera 31 and the radar 32 are provided, and information from both the onboard camera 31 and the radar 32 is used to predict a collision; however, this embodiment is not limited to this, and either one of the onboard camera 31 and the radar 32 may be used or another device may be used. In this embodiment, the situation inside the vehicle, that is, information about the state of the occupant P, is obtained by using image information obtained by the onboard camera 31; however, this embodiment is not limited to this, and a human detecting sensor or the like may be used.

Load Sensor 33

The load sensor 33 is provided at a plurality of locations in the seat cushion 11 and the armrest 14 of the seat 10 to detect loads put on the respective locations.

For example, the load sensors 33 detect loads put on nine respective locations in total, namely, five locations including a left front location, a right front location, a left rear location, a right rear location, and a center location in the seat cushion 11, two locations including front and rear locations in the left armrest 14L, and two locations including front and rear locations in the right armrest 14R.

The detected values are input to the controller 110 and recorded to the RAM of the controller 110, and load information is analyzed by the controller 110. Accordingly, the controller 110 can determine the seating state of the occupant P, for example, the position of the center of gravity of the occupant P.

Pressure Sensor 34

The pressure sensor 34 is provided at a plurality of locations in the seat cushion 11, the seatback 12, and the armrest 14 of the seat 10 to detect pressures put on the respective locations. For example the pressure sensors 34 detect pressures put on 24 respective locations in total, namely, nine locations in three front-rear rows and three right-left rows in the seat cushion 11, nine locations in three up-down rows and three right-left rows in the seatback 12, and six locations including three front-rear locations in each of the left armrest 14L and the right armrest 14R.

The detected values are input to the controller 110 and recorded to the RAM of the controller 110, and pressure information is analyzed by the controller 110. Accordingly, the controller 110 can determine the seating state of the occupant P, for example, the position of the center of gravity of the occupant P.

In this embodiment, the onboard camera 31, the load sensor 33, and the pressure sensor 34 are provided, and the position of the center of gravity of the occupant P can be determined by each of these devices; however, all of the devices might not be provided. Any of the devices may be used or another device may be used. In this embodiment, a large number of load sensors 33 and pressure sensors 34 are used; however, this embodiment is not limited this. Any number of sensors may be used as long as at least whether the center of gravity of the occupant P shifts to the right or to the left can be detected.

Main Airbag Device 50

The main airbag device 50 is controlled by the controller 110 to protect the occupant P from the impact of a collision. The main airbag device 50 includes a main inflator 51 and a main airbag body 52 (see, for example, FIG. 3A-1 to FIG. 3C-1).

Main Inflator 51

The main inflator 51 ignites gunpowder in response to an activation signal based on collision detection or collision prediction of the vehicle 1 by the controller 110 to generate gas from a chemical reaction caused by burning. The gas generated by the main inflator 51 is injected into the main airbag body 52.

Main Airbag Body 52

The main airbag body 52 is a bag body into which gas is injected by the main inflator 51. The main airbag body 52 is folded up small when not activated. When gas is injected from the main inflator 51, the main airbag body 52 inflates and deploys from the dashboard 5 toward the seat 10 to reduce the impact of the collision of the vehicle 1 on the head, chest, and so on of the occupant P. That is, when a collision of the vehicle 1 is predicted by the controller 110, the main airbag body 52 deploys from the front of the vehicle 1 toward the occupant P.

Armrest Moving Device 80

The armrest moving device 80 is controlled by the controller 110 to move the armrest 14. For example, the armrest moving device 80 is controlled by the controller 110 to rotate either one of the left armrest 14L and the right armrest 14R about the fixing point at which the armrest 14 is fixed to the seatback 12 such that the distal end part thereof points upward (hereinafter also referred to as upward rotation). The armrest moving device 80 is controlled by the controller 110 to rotate both the left armrest 14L and the right armrest 14R about the respective fixing points at which the left armrest 14L and the right armrest 14R are respectively fixed to the seatback 12 such that the distal end parts thereof point downward (hereinafter also referred to as downward rotation).

When detecting collision prediction of the vehicle 1, the controller 110 causes the armrest moving device 80 to rotate upward the left armrest 14L or the right armrest 14R over which the center of gravity of the occupant P shifts. When the shift of the position of the center of gravity of the occupant P is eliminated, the controller 110 causes the armrest moving device 80 to rotate both the left armrest 14L and the right armrest 14R downward.

Controller 110

The controller 110 controls operations of the occupant protection device 101. The controller 110 includes a central processing unit (CPU), a read-only memory (ROM) that stores a control program executed by the CPU, a data table, commands, data, and so on, the RAM that temporarily stores data, an electrically erasable and programmable read-only memory (EEPROM) formed of a rewritable non-volatile memory, and an input-output interface circuit. The controller 110 centrally controls the occupant protection device 101.

The controller 110 is coupled to the onboard camera 31, the radar 32, the load sensor 33, the pressure sensor 34, the main airbag device 50, the armrest moving device 80, and the ECU not illustrated via the input-output interface circuit.

The controller 110 performs collision prediction and collision determination for the vehicle 1 on the basis of information input from the onboard camera 31 and the radar 32.

An acceleration sensor (G sensor), a distance sensor, an impact sensor (pressure sensor), and the like may be used, and the controller 110 may perform collision prediction and collision determination on the basis of information input from these devices instead of the information input from the onboard camera 31 and the radar 32.

The controller 110 identifies the state of the occupant P, for example, the position of the arm of the occupant P, on the basis of the information input from the onboard camera 31.

The controller 110 identifies the position of the center of gravity of the occupant P on the basis of information input from the onboard camera 31, the load sensor 33, or the pressure sensor 34.

When predicting a collision of the vehicle 1, the controller 110 activates the armrest moving device 80 to rotate the armrest 14 upward and downward to push the arms of the occupant P away, and thereafter, causes the main airbag body 52 to deploy.

Operations of Occupant Protection Device 101

Now, operations of the occupant protection device 101 thus configured are described.

FIG. 3A-1 to FIG. 3C-2 illustrate movement of the armrest 14 and deployment of the main airbag body 52, where FIG. 3A-1 to FIG. 3C-1 are side views and FIG. 3A-2 to FIG. 3C-2 are front views. FIG. 4 is a flowchart illustrating overall operations of the occupant protection device 101.

In the occupant protection device 101, a control process illustrated in FIG. 4 is regularly performed by the controller 110 at predetermined intervals.

In the control process, the controller 110 first performs a collision prediction process (step S101). For example, the controller 110 predicts a collision of the vehicle 1 on the basis of information input from the onboard camera 31 and the radar 32. In addition to this collision prediction, the controller 110 also performs a collision determination process for the vehicle 1. In a case where the controller 110 detects a collision of the vehicle 1, the controller 110 may perform a process similar to a process described below that is performed at the time when a collision is predicted; however, it is desirable to perform a process that is performed at the time of a collision. In the process that is performed at the time of a collision, for example, the controller 110 does not cause the armrest 14 to move but causes the main airbag body 52 to deploy.

Next, the controller 110 determines whether collision prediction of the vehicle 1 is detected (step S102). That is, the controller 110 determines whether a collision of the vehicle 1 is predicted in the collision prediction process.

In a case where the controller 110 determines that a collision is predicted (YES in step S102), the flow proceeds to step 5103. In a case where the controller 110 determines that no collision is predicted (NO in step S102), the control process ends.

When detecting collision prediction of the vehicle 1, the controller 110 performs a process for determining the center of gravity of the occupant P (step S103). For example, the controller 110 detects the position of the center of gravity of the occupant P sitting in the seat 10 on the basis of information input from the load sensor 33. As described above, the controller 110 may detect the position of the center of gravity of the occupant P sitting in the seat 10 on the basis of information input from the onboard camera 31 or the pressure sensor 34.

Next, the controller 110 determines whether the center of gravity of the occupant P shifts (step S104). For example, the controller 110 determines whether the detected position of the center of gravity of the occupant P is within a predetermined range from the center of the seat 10 in the right-left direction.

In a case where the controller 110 determines that the center of gravity of the occupant P shifts (YES in step S104), the flow proceeds to step S105. In a case where the controller 110 determines that the center of gravity of the occupant P does not shift (NO in step S104), the flow proceeds to step S108.

In the case where the controller 110 determines that the center of gravity of the occupant P shifts, the controller 110 causes the armrest moving device 80 to rotate upward the left armrest 14L or the right armrest 14R over which the center of gravity shifts (step S105). For example, the controller 110 selects the left armrest 14L or the right armrest 14R to be moved on the basis of the direction in which the center of gravity of the occupant P shifts, and transmits to the armrest moving device 80 an activation signal for rotating the selected left armrest 14L or right armrest 14R upward. Accordingly, it is possible to make the occupant P who leans on one side sit upright to guide the center of gravity of the occupant P into a proper range.

Next, the controller 110 determines whether the center of gravity of the occupant P is moved into the proper range (step S106). For example, the controller 110 obtains a detection signal from the load sensor 33 again after upward movement of the armrest 14, detects the position of the center of gravity of the occupant P, and determines whether the detected position of the center of gravity of the occupant P is within the predetermined range from the center of the seat 10 in the right-left direction. In this case, a detection signal indicating the position of the center of gravity might not be obtained from the load sensor 33, and a detection signal from the onboard camera 31 or the pressure sensor 34 may be obtained.

In a case where the controller 110 determines that the center of gravity of the occupant P is moved into the proper range (YES in step S106), the flow proceeds to step S108. In a case where the controller 110 determines that the center of gravity of the occupant P is not moved into the proper range (NO in step S106), the flow proceeds to step S107.

In the case where the controller 110 determines that the center of gravity of the occupant P is not moved into the proper range, the controller 110 determines whether a predetermined time has elapsed since the movement of the armrest 14 (step S107). In a case where the controller 110 determines that the predetermined time has elapsed (YES in step S107), the flow proceeds to step S109. In a case where the controller 110 determines that the predetermined time has not elapsed (NO in step S107), the flow returns to step S105, and the above-described process is repeated.

In the case where the controller 110 determines that the center of gravity of the occupant P does not shift from the beginning (NO in step S104) or in the case where the controller 110 determines that the center of gravity of the occupant P is moved into the proper range (YES in step S106), the controller 110 performs a process for removing the armrest 14 (step S108). For example, the controller 110 transmits to the armrest moving device 80 an activation signal for rotating both the left armrest 14L and the right armrest 14R downward. Accordingly, the arms of the occupant P resting on the armrest 14 can be put down.

Next, the controller 110 performs a process for causing the main airbag body 52 to deploy (step S109). For example, the controller 110 transmits an activation signal to the main inflator 51 of the main airbag device 50 to cause ignition to occur and to generate gas. In the main airbag device 50, when the main inflator 51 generates gas, the gas is injected into the main airbag body 52, and the main airbag body 52 deploys backward toward the upper body of the occupant P.

On the other hand, as illustrated in FIG. 5A-1 to FIG. 5C-2, in a case where the posture of the occupant P is not corrected, downward rotation of the armrest 14 is not performed.

For example, the controller 110 first causes the armrest moving device 80 to rotate upward the armrest 14 on the side over which the center of gravity shifts (step S105). Thereafter, in a case where the center of gravity of the occupant P does not move into the proper range even after the elapse of the predetermined time (NO in step S106 and YES in step S107), the controller 110 does not cause the armrest 14 to rotate downward (does not perform the process in step S108) but causes the main airbag body 52 to deploy (step S109).

In this embodiment, in a case where the center of gravity of the occupant P is not moved into the proper range even though the armrest 14 is rotated upward, the armrest 14 rotated upward is left as is; however, this embodiment is not limited to this, and the armrest 14 may be returned to the original position. Accordingly, for example, even in a case where the hand of the occupant P approaches their face due to the upward rotation of the armrest 14, the armrest 14 is returned to the original position so that the position of the hand can be moved away from the face. Therefore, at the time of deployment of the main airbag body 52, it is possible to prevent the hand or an object (for example, a portable terminal) held in the hand from coming into contact with the face or head, and the occupant P can be appropriately protected.

In this embodiment, the armrest moving device 80 rotates the armrest 14 upward and downward; however, this embodiment is not limited to this, and the armrest moving device 80 may translate the armrest 14 upward and downward in the vertical direction. The armrest moving device 80 may move the armrest 14 upward toward the inside and downward toward the outside. The armrest moving device 80 may rotate or move the armrest 14 in the right-left direction toward the outside.

In this embodiment, the armrest moving device 80 moves or rotates the armrest 14; however, this embodiment is not limited to this. An airbag or the like may be caused to deploy from the armrest 14 to, for example, correct the posture of the occupant P or push their arms downward.

As described above, the occupant protection device 101 according to this embodiment causes the armrest 14 to rotate upward and subsequently rotate downward to push the arms of the occupant P downward, and thereafter, causes the main airbag body 52 to deploy toward the upper body of the occupant P. That is, the posture of the occupant P can be corrected before the arms are pushed downward. Therefore, at the time when the arms of the occupant P are pushed downward, it is possible to prevent the posture of the occupant P from becoming off balance and the occupant P from falling off the seat 10, and the occupant P can be appropriately protected.

In the occupant protection device 101 according to this embodiment, in a case where the posture of the occupant P is not corrected even though the armrest 14 is rotated upward, the occupant protection device 101 does not cause the armrest 14 to rotate downward but causes the main airbag body 52 to deploy. Therefore, the occupant P can be appropriately protected without the posture of the occupant P becoming carefully off balance.

In one embodiment, the onboard camera 31, the load sensor 33, and the pressure sensor 34 may serve as an "occupant center-of-gravity detecting device".

In one embodiment, the controller 110 may serve as a "collision predictor and a deployment controller".

In one embodiment, the main airbag body 52 may serve as a "main airbag".

According to embodiments of the disclosure, it is possible to provide an occupant protection device that can provide optimum occupant protection even in a case where an occupant is resting their arm on an armrest.

The controller 110 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An occupant protection device for a vehicle, the occupant protection device comprising:
a collision predictor configured to predict a collision of the vehicle;
a main airbag configured to deploy toward a seatback of a seat of the vehicle from a front of the vehicle when the collision predictor predicts a collision of the vehicle;
an occupant center-of-gravity detecting device configured to detect a position of a center of gravity of an occupant seated on the seat;
an adjustable armrest pivotably supported by the seatback at a first side of the seatback, the first side is a side of the seatback in a first direction along a vehicle width direction; and
a deployment controller configured to:
perform, when the collision predictor predicts a collision of the vehicle, a first determination to determine whether the position of the center of gravity of the occupant detected by the occupant center-of-gravity detecting device shifts to the first direction relative to a center of the seat in the vehicle width direction; and
cause, when the position of the center of gravity of the occupant shifts to the first direction relative to the center of the seat in the first determination, the adjustable armrest to pivot upward, and thereafter, cause the main airbag to deploy, and
wherein the adjustable armrest is fixed to the seatback at a pivot point for pivoting rotation of the adjustable armrest about a rotation axis that extends through the pivot point at the seatback and in the vehicle width direction, with an upward rotation of the adjustable armrest representing the adjustable armrest upward movement used in guiding the center of gravity of the occupant into a proper range on a basis of the position of the center of gravity of the occupant detected by the occupant center-of-gravity detecting device.

2. The occupant protection device for a vehicle according to claim 1, wherein the occupant center-of-gravity detecting device comprises any of a camera, a load sensor, or a pressure sensor.

3. The occupant protection device for the vehicle according to claim 1, wherein the deployment controller is configured to determine that the position of the center of gravity of the occupant shifts to the first direction in the first determination when i) the position of the center of gravity of the occupant is located toward the first direction from the center of the seat and ii) a distance in the vehicle width direction between the position of the center of gravity of the occupant and the center of the seat is greater than a predetermined value.

4. The occupant protection device for the vehicle according to claim 3,
wherein the deployment controller is configured to:
perform a second determination to determine whether the distance in the vehicle width direction between the position of the center of gravity of the occupant and the center of the seat is greater than the predetermined value after causing the adjustable armrest to pivot upward and before causing the main airbag to deploy;
cause, when the distance in the vehicle width direction between the position of the center of gravity of the occupant and the center of the seat is less than or equal to the predetermined value in the second determination, the adjustable armrest to pivot down, and thereafter, cause the main airbag to deploy; and
maintain, when the distance in the vehicle width direction between the position of the center of gravity of the occupant and the center of the seat is greater than the predetermined value in the second determination, a position of the adjustable armrest, and thereafter, cause the main airbag to deploy.

5. The occupant protection device for the vehicle according to claim 4, wherein the adjustable armrest, upon pivoting down, has a free end positioned below an upper surface of a seat cushion of the seat.

6. An occupant protection device for a vehicle, the occupant protection device comprising:
a main airbag configured to deploy toward a seatback of a seat of the vehicle from a front of the vehicle when a collision of the vehicle is predicted;
an occupant center-of-gravity detecting device configured to detect a position of a center of gravity of an occupant seated on the seat;
an adjustable armrest pivotably supported by the seatback at a first side of the seatback, the first side is a side of the seatback in a first direction along a vehicle width direction; and
circuitry configured to:
predict a collision of the vehicle,
perform, when a collision of the vehicle is predicted, a first determination to determine whether the position of the center of gravity of the occupant detected by the occupant center-of-gravity detecting device shifts to the first direction relative to a center of the seat in the vehicle width direction; and
cause, when the position of the center of gravity of the occupant shifts to the first direction relative to the center of the seat in the first determination, the adjustable armrest to pivot upward, and thereafter, cause the main airbag to deploy, and
wherein the circuitry is configured to determine that the position of the center of gravity of the occupant shifts to the first direction in the first determination when i) the position of the center of gravity of the occupant is located toward the first direction from the center of the seat and ii) a distance in the vehicle width direction between the position of the center of gravity of the occupant and the center of the seat is greater than a predetermined value, and
wherein the circuitry is configured to:
perform a second determination to determine whether the distance in the vehicle width direction between the position of the center of gravity of the occupant and the center of the seat is greater than the predetermined value after causing the adjustable armrest to pivot upward and before causing the main airbag to deploy;
cause, when the distance in the vehicle width direction between the position of the center of gravity of the occupant and the center of the seat is less than or equal to the predetermined value in the second determination, the adjustable armrest to pivot down, and thereafter, cause the main airbag to deploy; and
maintain, when the distance in the vehicle width direction between the position of the center of gravity of the occupant and the center of the seat is greater than the predetermined value in the second determination, a position of the adjustable armrest, and thereafter, cause the main airbag to deploy.

7. The occupant protection device for the vehicle according to claim 6, wherein the adjustable armrest, upon pivoting down, has a free end positioned below an upper surface of a seat cushion of the seat.

8. The occupant protection device for the vehicle according to claim 6, wherein the adjustable armrest is fixed to the seatback at a pivot point for pivoting rotation of the adjustable armrest about a rotation axis that extends through the pivot point at the seatback and in the vehicle width direction, with an upward rotation of the adjustable armrest representing the adjustable armrest upward movement used in guiding the center of gravity of the occupant into a proper range on a basis of the position of the center of gravity of the occupant detected by the occupant center-of-gravity detecting device.

9. An occupant protection device for a vehicle, the occupant protection device comprising:
a collision predictor configured to predict a collision of the vehicle;
a main airbag configured to deploy toward a seatback of a seat of the vehicle from a front of the vehicle when the collision predictor predicts a collision of the vehicle;
an occupant center-of-gravity detecting device configured to detect a position of a center of gravity of an occupant seated on the seat;
an adjustable armrest pivotably supported by the seatback at a first side of the seatback, the first side is a side of the seatback in a first direction along a vehicle width direction; and
a deployment controller configured to:
perform, when the collision predictor predicts a collision of the vehicle, a first determination to determine whether the position of the center of gravity of the occupant detected by the occupant center-of-gravity detecting device shifts to the first direction relative to a center of the seat in the vehicle width direction;

cause, when the position of the center of gravity of the occupant shifts to the first direction relative to the center of the seat in the first determination, the adjustable armrest to pivot upward, and thereafter, cause the main airbag to deploy; and cause, when the position of the center of gravity of the occupant does not shift to the first direction relative to the center of the seat in the first determination, the adjustable arm rest to pivot down, and thereafter, cause the main airbag to deploy, and wherein the adjustable armrest is fixed to the seatback at a pivot point for pivoting rotation of the adjustable armrest about a rotation axis that extends through the pivot point at the seatback and in the vehicle width direction, with an upward rotation of the adjustable armrest representing the adjustable armrest upward movement used in guiding the center of gravity of the occupant into a proper range on a basis of the position of the center of gravity of the occupant detected by the occupant center-of-gravity detecting device.

10. The occupant protection device for the vehicle according to claim 9, wherein the deployment controller is configured to determine that the position of the center of gravity of the occupant shifts to the first direction in the first determination when i) the position of the center of gravity of the occupant is located toward the first direction from the center of the seat and ii) a distance in the vehicle width direction between the position of the center of gravity of the occupant and the center of the seat is greater than a predetermined value.

11. The occupant protection device for the vehicle according to claim 10, wherein the deployment controller is configured to:

perform a second determination to determine whether the distance in the vehicle width direction between the position of the center of gravity of the occupant and the center of the seat is greater than the predetermined value after causing the adjustable armrest to pivot upward and before causing the main airbag to deploy;

cause, when the distance in the vehicle width direction between the position of the center of gravity of the occupant and the center of the seat is less than or equal to the predetermined value in the second determination, the adjustable armrest to pivot down, and thereafter, cause the main airbag to deploy; and maintain, when the distance in the vehicle width direction between the position of the center of gravity of the occupant and the center of the seat is greater than the predetermined value in the second determination, a position of the adjustable armrest, and thereafter, cause the main airbag to deploy.

12. The occupant protection device for the vehicle according to claim 9, wherein the adjustable armrest, upon pivoting down, has a free end positioned below an upper surface of a seat cushion of the seat.

* * * * *